US012600198B2

(12) United States Patent
Matsumoto

(10) Patent No.: US 12,600,198 B2
(45) Date of Patent: Apr. 14, 2026

(54) VEHICLE AIR CONDITIONING SYSTEM

(71) Applicant: Honda Motor Co., Ltd., Tokyo (JP)

(72) Inventor: Subaru Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 18/356,242

(22) Filed: Jul. 21, 2023

(65) Prior Publication Data

US 2024/0123795 A1 Apr. 18, 2024

(30) Foreign Application Priority Data

Oct. 14, 2022 (CN) .......................... 202211259418.5

(51) Int. Cl.
B60H 1/00 (2006.01)
B60H 3/02 (2006.01)
(52) U.S. Cl.
CPC ..... B60H 1/00842 (2013.01); B60H 1/00564 (2013.01); B60H 3/024 (2013.01)
(58) Field of Classification Search
CPC .......... B60H 1/00564; B60H 1/00842; B60H 1/024; B60H 3/02; B60H 3/024
See application file for complete search history.

(56) References Cited

U.S. PATENT DOCUMENTS 5,556,028 A * 9/1996 Khelifa .................. B60H 3/024
62/271

FOREIGN PATENT DOCUMENTS

JP 4567478 10/2010
JP 2016135653 7/2016

* cited by examiner

*Primary Examiner* — Edelmira Bosques
*Assistant Examiner* — Michael James Giordano
(74) *Attorney, Agent, or Firm* — JCIPRNET

(57) ABSTRACT

A vehicle air conditioning system is provided. The vehicle air conditioning system includes: an air conditioning unit, including a blower and a temperature control module; and a dehumidification device, disposed between the blower and an evaporator of the temperature control module, enabling a part of air conditioning air flowing in from the blower to flow into the dehumidification device, and including an air volume adjusting mechanism for forming an air inflow channel of the dehumidification device; an air path switching mechanism for forming an air discharge channel of the dehumidification device; and a dehumidification element disposed on a flow path of the part of the air conditioning air flowing in from the blower between the air volume adjusting mechanism and the air path switching mechanism. The air volume adjusting mechanism and the air path switching mechanism both include a damper structure configured to adjust a degree of opening.

20 Claims, 12 Drawing Sheets

VEHICLE AIR CONDITIONING SYSTEM

CROSS-REFERENCE TO RELATED APPLICATION

This application claims the priority benefit of China application serial no. 202211259418.5, filed on Oct. 14, 2022. The entirety of the above-mentioned patent application is hereby incorporated by reference herein and made a part of this specification.

BACKGROUND

Technical Field

The disclosure relates to a vehicle air conditioning system.

DESCRIPTION OF RELATED ART

The dehumidification device may absorb air in a vehicle for dehumidification to control the humidity in the vehicle. However, in the case where an independent dehumidification device is disposed, the number of required components in the vehicle is increased, and the configuration of the three types of air duct systems of air intake, dehumidified air, and humidified exhaust of the dehumidification device also affects the element layout of other systems in the vehicle. Therefore, it is necessary to integrate the dehumidification device and other systems into an integrated system component for installation.

On the other hand, the vehicle air conditioning system is an essential device for a vehicle with a closed vehicle compartment structure and may be used to adjust the ambient temperature in the vehicle compartment, such as providing cool or warm vehicle compartment temperature. When the dehumidification device is installed in the vehicle air conditioning system, the air volume of the blower of the vehicle air conditioning system changes according to the temperature inside the vehicle, and different ambient pressures are correspondingly generated to control the air supply volume of the vehicle air conditioning system. Therefore, when the dehumidification device performs a dehumidification or regeneration process, the air supply volume of dehumidified dried air or regenerated humidified air is also affected by the different ambient pressures formed by the blower, so it is difficult to keep a constant air volume. During the dehumidification process, once the air supply volume of the dehumidified dried air conditioning air fluctuates with time, the dehumidification performance also fluctuates with time, thereby affecting the anti-fog performance in the vehicle. On the other hand, during the regeneration process, if the air volume of the humidified air on the regeneration side increases, the ambient temperature will drop, and the dehumidification performance may decrease. However, once the air supply volume of the humidified air on the regeneration side decreases, the dew point temperature of the humidified air may increase. In the case where the dew point temperature of the humidified air exceeds the threshold value of the dew point temperature of air at the discharge port, dew condensation may easily occur during discharge from the vehicle, thereby risking deteriorating the vehicle body.

SUMMARY

The disclosure provides a vehicle air conditioning system, which includes: an air conditioning unit, configured to adjust temperature in a vehicle compartment and including a blower and a temperature control module; and a dehumidification device, configured to adjust humidity in the vehicle compartment, disposed between the blower and an evaporator of the temperature control module, and enabling a part of air conditioning air flowing in from the blower to flow into the dehumidification device, and the dehumidification device including an air volume adjusting mechanism, used to form an air inflow channel of the dehumidification device; an air path switching mechanism, used to form an air discharge channel of the dehumidification device; and a dehumidification element, disposed on a flow path of the part of the air conditioning air flowing in from the blower between the air volume adjusting mechanism and the air path switching mechanism. The air volume adjusting mechanism and the air path switching mechanism both include a damper structure configured to adjust a degree of opening, and during an operating process of the dehumidification device, the dehumidification device controls the degrees of opening of the damper structures of the air volume adjusting mechanism and the air path switching mechanism, so that the part of the air conditioning air passing through the dehumidification device is kept constant.

DESCRIPTION OF THE EMBODIMENTS

Figure 1A:
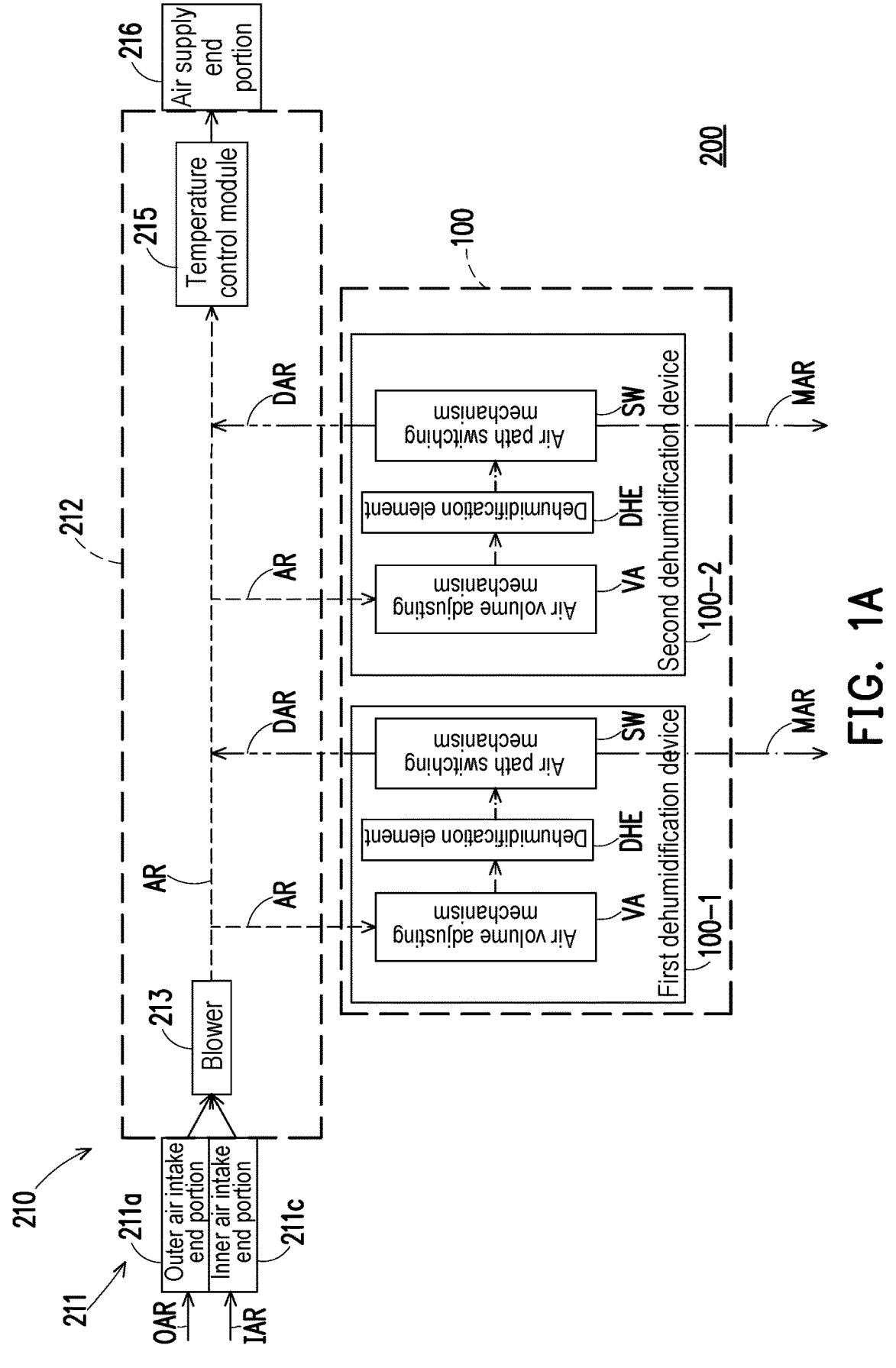
FIG. 1A is a block diagram of a vehicle air conditioning system according to an embodiment of the disclosure.

The disclosure provides a vehicle air conditioning system, which has stable and preferable dehumidification performance.

The disclosure provides a vehicle air conditioning system, which includes: an air conditioning unit, configured to adjust temperature in a vehicle compartment and including a blower and a temperature control module; and a dehumidification device, configured to adjust humidity in the vehicle compartment, disposed between the blower and an evaporator of the temperature control module, and enabling a part of air conditioning air flowing in from the blower to flow into the dehumidification device, and the dehumidification device including an air volume adjusting mechanism, used to form an air inflow channel of the dehumidification device; an air path switching mechanism, used to form an air discharge channel of the dehumidification device; and a dehumidification element, disposed on a flow path of the part of the air conditioning air flowing in from the blower between the air volume adjusting mechanism and the air path switching mechanism. The air volume adjusting mechanism and the air path switching mechanism both include a damper structure configured to adjust a degree of opening, and during an operating process of the dehumidification device, the dehumidification device controls the degrees of opening of the damper structures of the air volume adjusting mechanism and the air path switching mechanism, so that the part of the air conditioning air passing through the dehumidification device is kept constant.

In an embodiment of the disclosure, the degree of opening of the damper structure of the air volume adjusting mechanism is adjusted corresponding to a size of an air supply volume passing through the blower of the vehicle air conditioning system in different temperature ranges.

In an embodiment of the disclosure, the dehumidification device further includes: an actuator; and a connection mechanism. The actuator connects the air volume adjusting mechanism and the air path switching mechanism through the connection mechanism to control the degrees of opening of the damper structures of both the air volume adjusting mechanism and the air path switching mechanism.

In an embodiment of the disclosure, the air conditioning unit further includes a main flow channel and a branch flow channel, the main flow channel is communicated with an air intake end portion and an air supply end portion of the air conditioning unit and is used for the air conditioning air flowing in to flow from the blower to the temperature control module, and the branch flow channel diverges from the main flow channel, is communicated with the main flow channel and the air inflow channel of the dehumidification device, and is used for the part of the air conditioning air flowing in from the blower to flow into the dehumidification device.

In an embodiment of the disclosure, the air path switching mechanism switches the air discharge channel between a return air path and a discharge air path. The return air path is an air path for returning dehumidified dried air conditioning air back to the main flow path of the air conditioning unit, and the discharge air path is an air path for discharging humidified air generated after heating the dehumidification device to an outside of a vehicle.

In an embodiment of the disclosure, the dehumidification device is disposed on a connection channel connecting the blower of the air conditioning unit and the temperature control module.

In an embodiment of the disclosure, the connection channel is formed as a part of the main flow path, the branch flow channel is communicated with the connection channel, the degree of opening of the damper structure of the air volume adjusting mechanism is used to form and adjust a size of an adjustable cross-sectional area of an inflow pathway of the branch flow channel, and the adjustable cross-sectional area of the inflow pathway of the branch flow channel is less than or equal to half of a cross-sectional area of the connection channel.

In an embodiment of the disclosure, an air volume of the part of the air conditioning air flowing from the branch flow path into the dehumidification device is less than or equal to an air volume of another part of air conditioning air that does not flow into the dehumidification device in the main flow path.

In an embodiment of the disclosure, the vehicle air conditioning system further includes a partition. The partition is disposed in the main flow channel and is used to divert the part of the air conditioning air in the main flow channel to the branch flow channel.

In an embodiment of the disclosure, the partition faces an air inlet of the dehumidification device, and the partition extends from an end of the air inlet of the dehumidification device to other end of the air inlet of the dehumidification device.

In an embodiment of the disclosure, the partition faces an air inlet and an exhaust port of the dehumidification device, and the partition extends from an upstream side of an air supply port of the blower for connecting the main flow channel to an end of the exhaust port of the dehumidification device away from the air inlet.

In an embodiment of the disclosure, the vehicle air conditioning system further includes a main flow air volume distribution mechanism. The main flow air volume distribution mechanism is disposed in the main flow channel and includes a damper structure configured to adjust a degree of opening. The degree of opening of the damper structure of the main flow air volume distribution mechanism is adjusted corresponding to a size of an air supply volume passing through the blower of the vehicle air conditioning system in different temperature ranges to control an air volume of air conditioning air in the main flow channel.

In an embodiment of the disclosure, the main flow air volume distribution mechanism is located on a flow path of dehumidified dried air conditioning air flowing from an exhaust port of the dehumidification device to the temperature control module, and the dehumidified dried air conditioning air merges with another part of air conditioning air that does not flow into the dehumidification device in the main flow channel after passing through the main flow air volume distribution mechanism.

In an embodiment of the disclosure, the degree of opening of the damper structure of the main air flow distribution mechanism adjusts a size of a channel area of another part of air conditioning air that does not flow into the dehumidification device in the main flow channel.

In an embodiment of the disclosure, there are multiple dehumidification devices, which include a first dehumidification device and a second dehumidification device. When dehumidification is performed through a dehumidification element of one of the first dehumidification device and the second dehumidification device, other one of the first dehumidification device and the second dehumidification device heats a dehumidification element of the other one to regenerate the other one of the first dehumidification device and the second dehumidification device.

In an embodiment of the disclosure, when dehumidification is performed through the first dehumidification device, a degree of opening of a damper structure of an air volume adjusting mechanism of the first dehumidification device is greater than a degree of opening of a damper structure of an air volume adjusting mechanism of the second dehumidification device, and when dehumidification is performed through the second dehumidification device, the degree of opening of the damper structure of the air volume adjusting mechanism of the second dehumidification device is greater than the degree of opening of the damper structure of the air volume adjusting mechanism of the first dehumidification device.

In an embodiment of the disclosure, the degrees of opening of the damper structures of the air volume adjusting mechanisms of both the first dehumidification device and the second dehumidification device are adjusted corresponding to the size of the air supply volume passing through the blower of the vehicle air conditioning system in different temperature ranges.

In an embodiment of the disclosure, the degrees of opening of the damper structures of the air volume adjusting mechanisms of both the first dehumidification device and the second dehumidification device correspondingly increase as the air supply volume of the blower decreases.

In an embodiment of the disclosure, the vehicle air conditioning system further includes a main flow air volume distribution mechanism, which includes a damper structure configured to adjust a degree of opening. The degree of opening of the damper structure of the main flow air volume distribution mechanism is adjusted corresponding to the size of the air supply volume passing through the blower of the vehicle air conditioning system in different temperature ranges to control an air volume of air conditioning air in the main flow channel. The degree of opening of the damper structure of the main flow air volume distribution mechanism correspondingly decreases as the air supply volume of the blower decreases.

In an embodiment of the disclosure, the degrees of opening of the damper structures of the air volume adjusting mechanisms of both the first dehumidification device and the second dehumidification device do not change with the size of the air supply volume of the blower.

Based on the above, in the vehicle air conditioning system of an embodiment of the disclosure, the dehumidification device can keep both the dehumidified dried air conditioning air and the heated humidified air discharged from the vehicle constant during the dehumidification and regeneration processes of the air conditioning air through controlling the degree of opening of the damper structure of the air volume adjusting mechanism, so that the dehumidification performance of the dehumidification device can be kept stable. Moreover, the dehumidification device can also adjust the air volume of another part of the air conditioning air in the main flow channel through controlling the degree of opening of the damper structure of the main flow air volume distribution mechanism, so that the air conditioning air flowing into the dehumidification device via the branch flow channel can be kept at a certain air volume. In this way, during the dehumidification and regeneration processes of the air conditioning air, the dehumidified dried air conditioning air and the heated humidified air discharged from the vehicle can be kept constant, so that the dehumidification performance of the dehumidification device can be kept stable. In addition, since the dehumidification device can alternately dehumidify the air in the vehicle through both the dehumidification element of the first dehumidification device and the dehumidification element of the second dehumidification device without interruption, and intermittently regenerate the dehumidification element of the first dehumidification device and the dehumidification device of the second dehumidification device respectively, the preferable dehumidification function of the dehumidification device can be kept all the time.

Figures 1B, 1C:
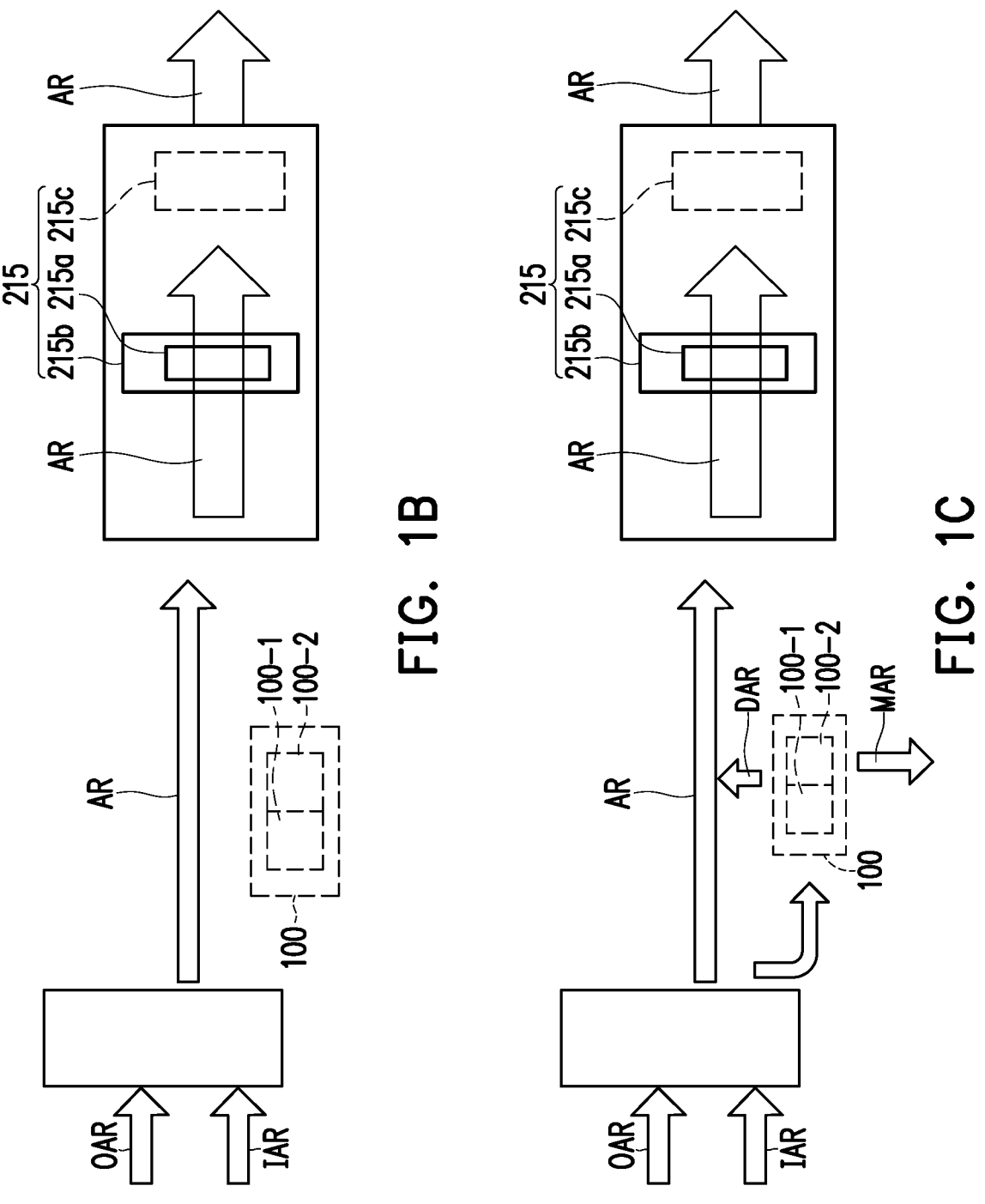
FIG. 1B is a schematic view of an air flow situation of the vehicle air conditioning system of FIG. 1A in a cooling mode.
FIG. 1C is a schematic view of an air flow situation of the vehicle air conditioning system of FIG. 1A in a warming mode.
Figure 2:
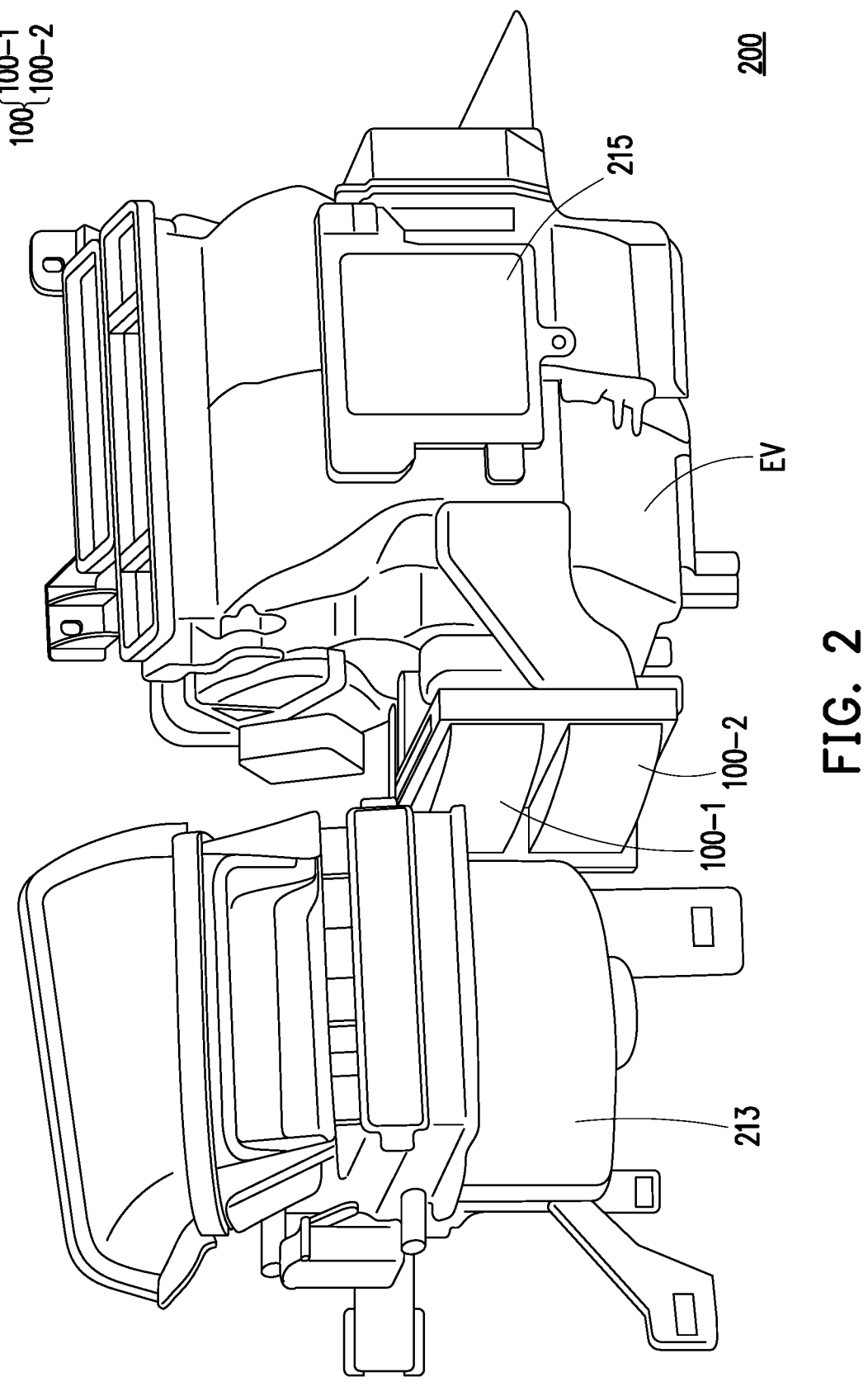
FIG. 2 is a schematic structural view of a vehicle air conditioning system of FIG. 1A.
Figure 3A:
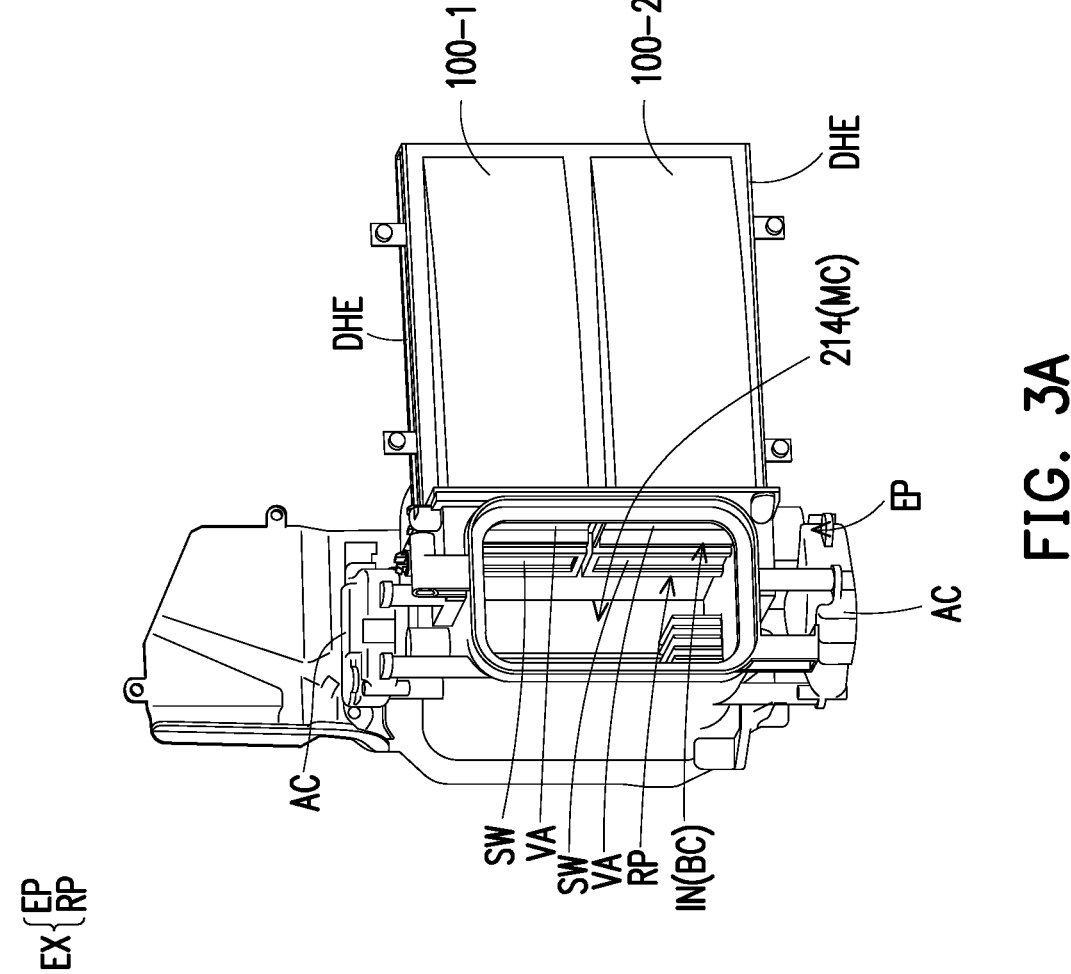
FIG. 3A is a schematic structural view of a dehumidification device of the vehicle air conditioning system of FIG. 2.
Figure 3B:
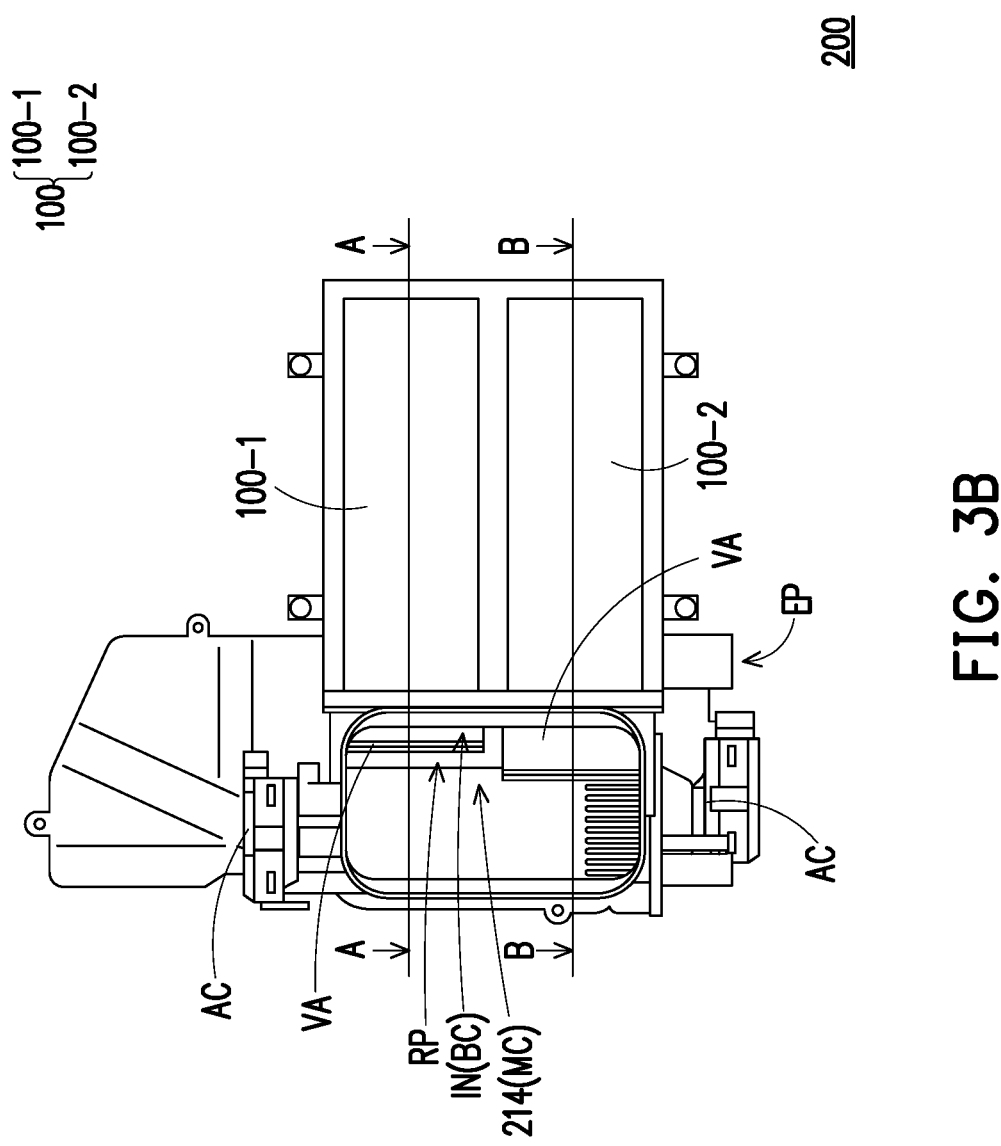
FIG. 3B is a schematic side view of the dehumidification device of FIG. 3A.
Figure 3C:
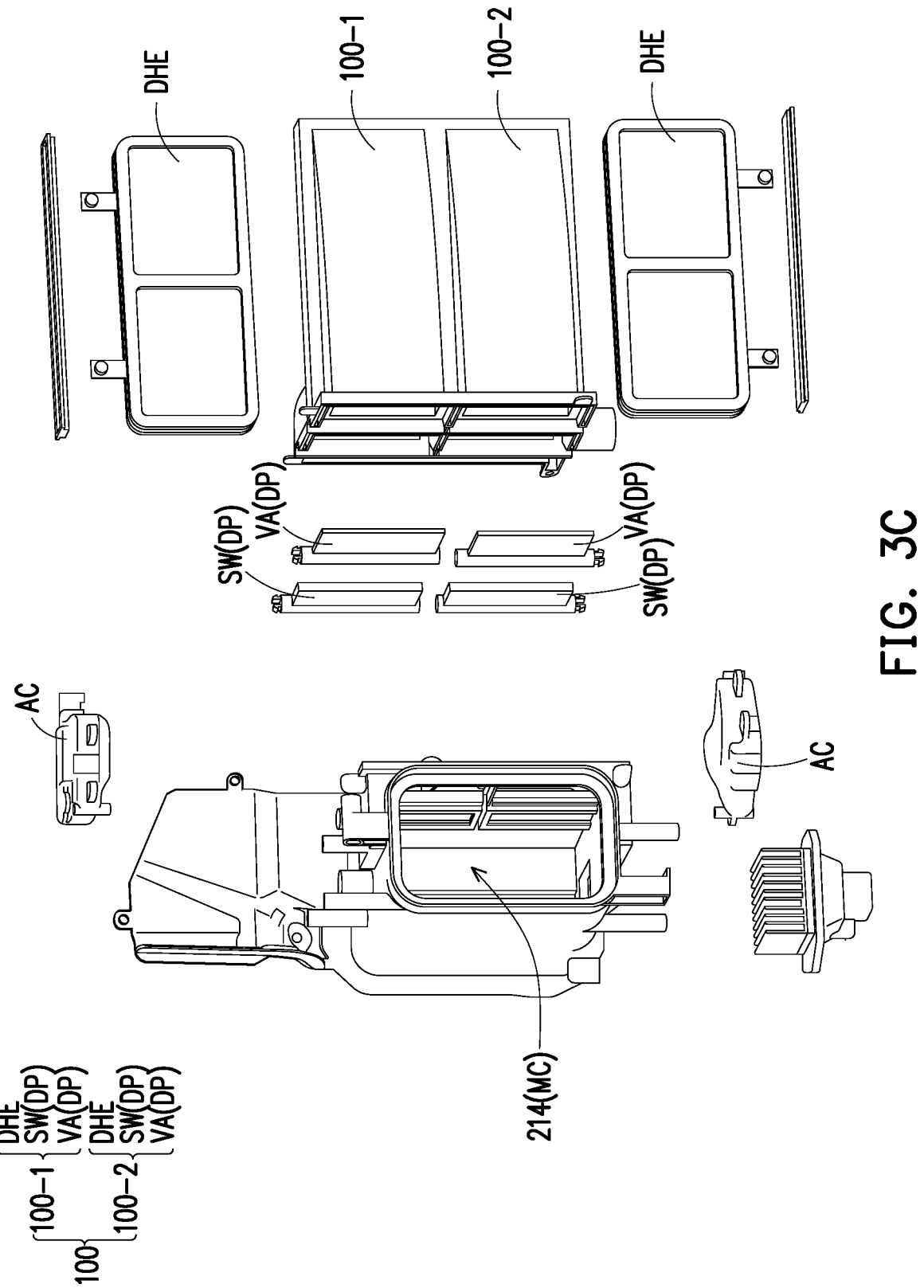
FIG. 3C is an exploded view of the dehumidification device of FIG. 3A.
Figures 4A, 4B, 4C:
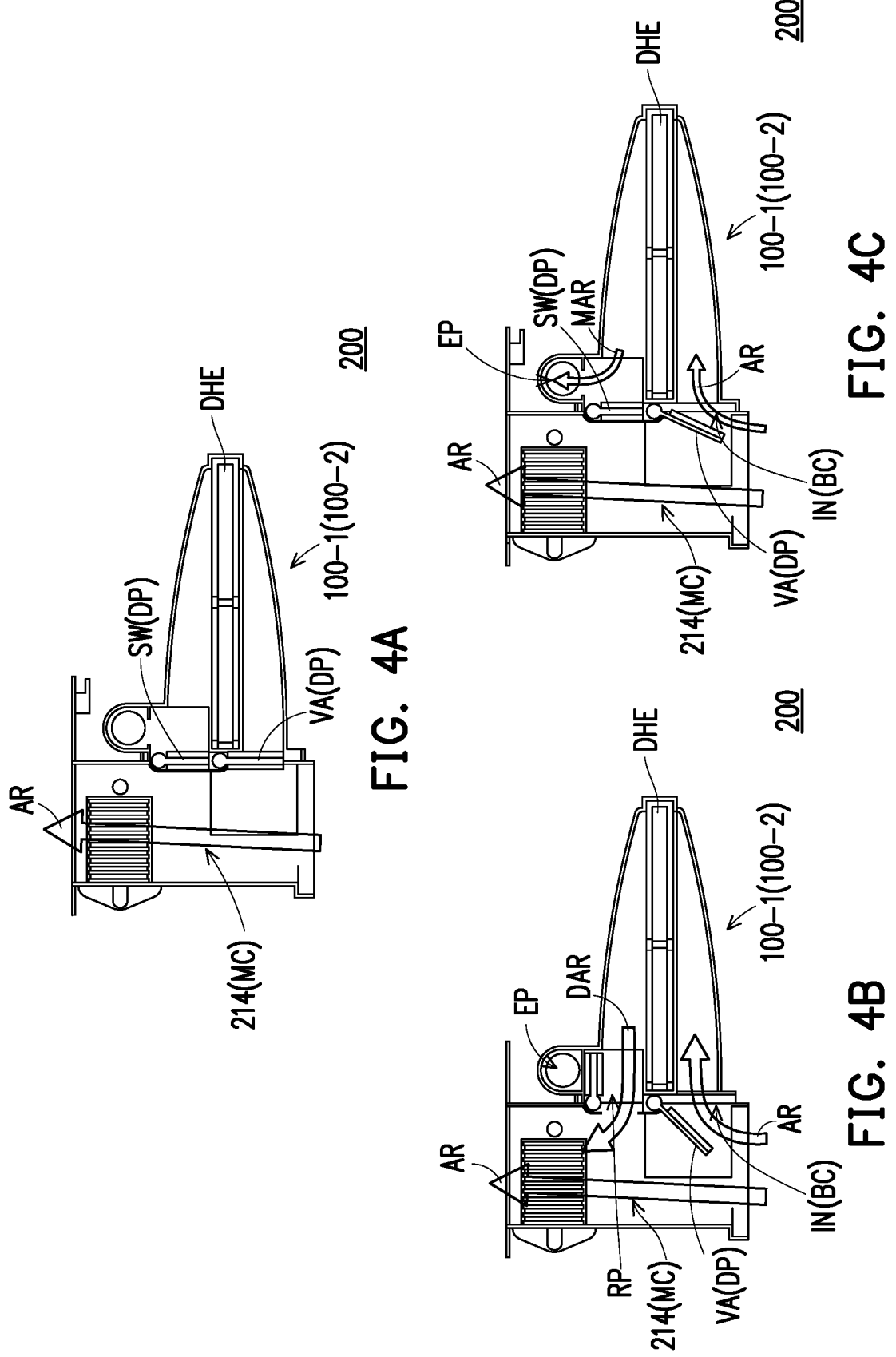
FIG. 4A to FIG. 4C are schematic cross-sectional views of the dehumidification device of FIG. 3A in different operating modes.
Figure 5B:
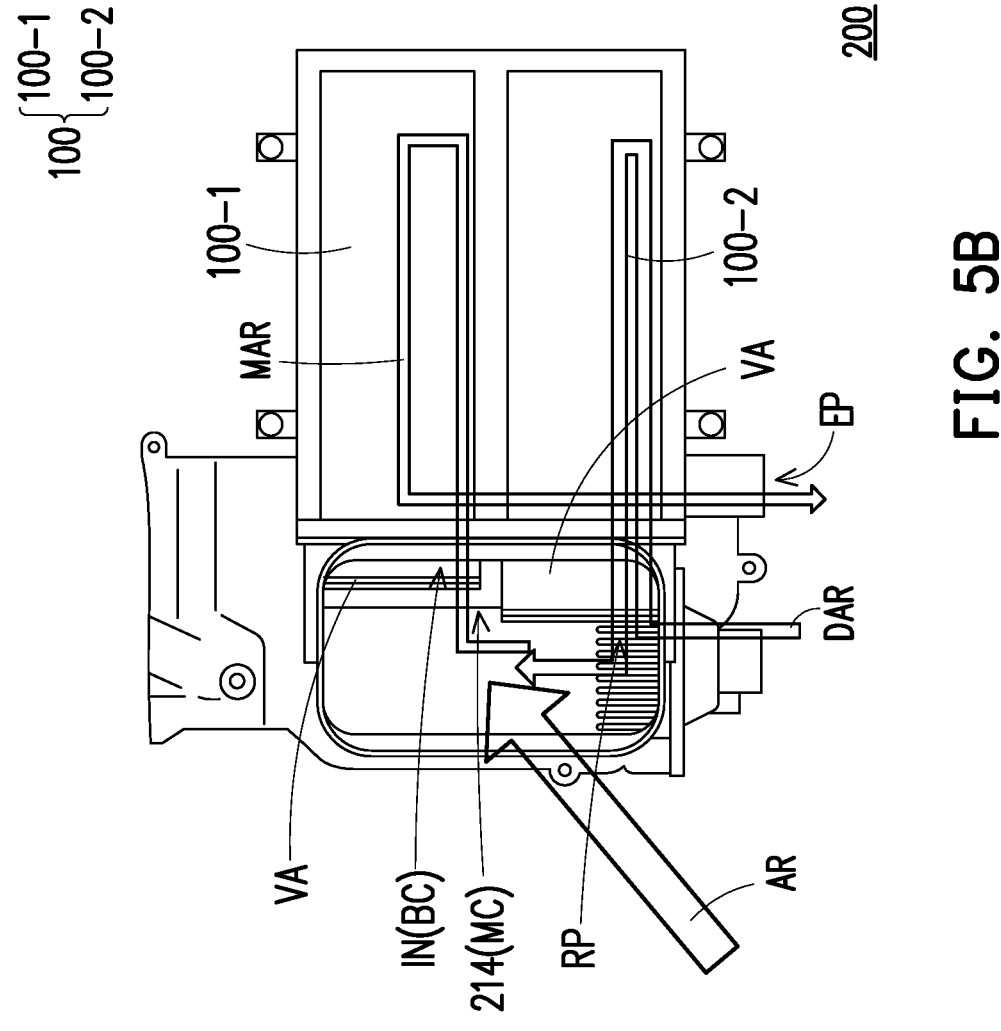
FIG. 5A and FIG. 5B are schematic views comparing channel cross-sectional areas of different air flows of the vehicle air conditioning system of FIG. 2.
Figure 5A:
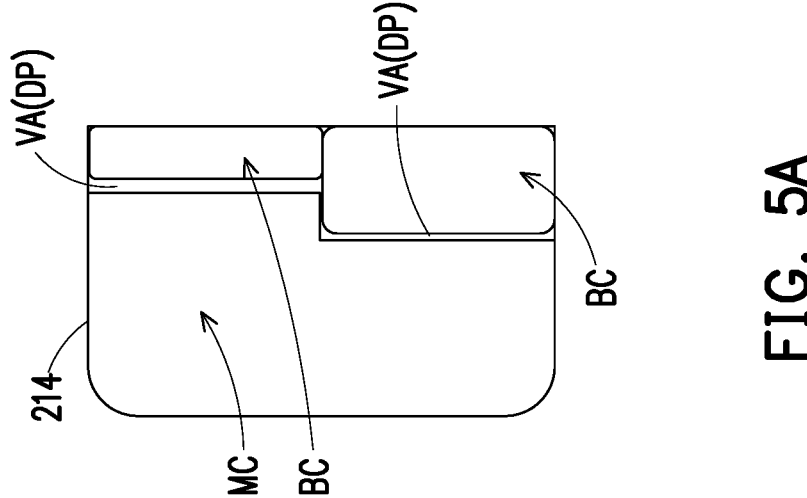
Figure 6:
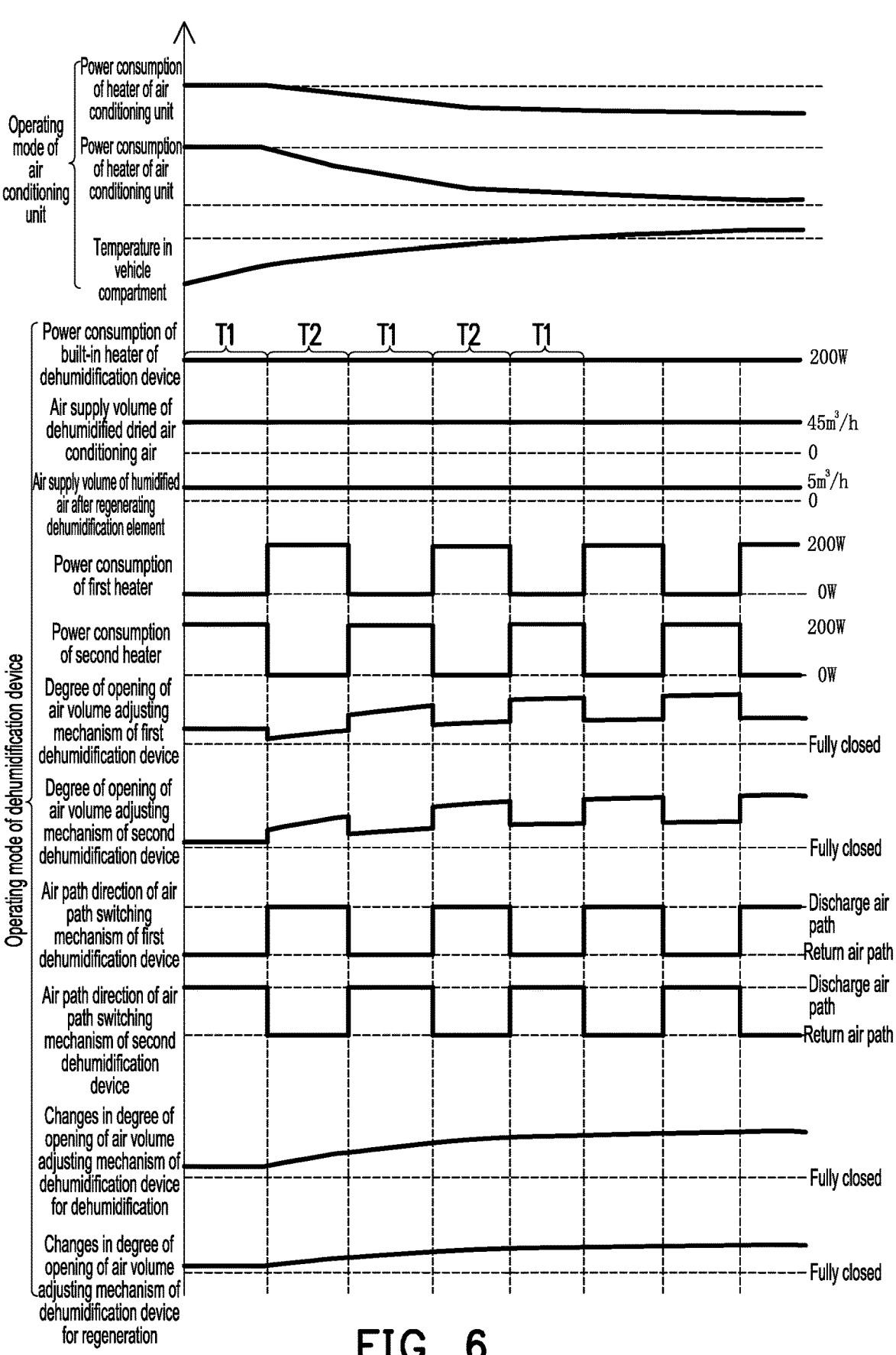
FIG. 6 is a schematic view of control parameter change situations of various elements of the vehicle air conditioning system of FIG. 5A and FIG. 5B during different time periods.

FIG. 1A is a block diagram of a vehicle air conditioning system according to an embodiment of the disclosure. FIG. 1B is a schematic view of an air flow situation of the vehicle air conditioning system of FIG. 1A performing a cooling process on air. FIG. 1C is a schematic view of an air flow situation of the vehicle air conditioning system of FIG. 1A performing a warming process on air. FIG. 2 is a schematic structural view of a vehicle air conditioning system of FIG. 1A. FIG. 3A is a schematic structural view of a dehumidification device of the vehicle air conditioning system of FIG. 2. FIG. 3B is a schematic side view of the dehumidification device of FIG. 3A. FIG. 3C is an exploded view of the dehumidification device of FIG. 3A. FIG. 4A to FIG. 4C are schematic cross-sectional views of the dehumidification device of FIG. 3A in different operating modes. FIG. 5A and FIG. 5B are schematic views comparing channel cross-sectional areas of different air flows of the vehicle air conditioning system of FIG. 2. FIG. 6 is a schematic view of control parameter change situations of various elements of the vehicle air conditioning system of FIG. 5A and FIG. 5B during different time periods.

Please refer to FIG. 1A. In the embodiment, a vehicle air conditioning system 200 includes an air conditioning unit 210 and a dehumidification device 100 as a humidity adjustment unit. Specifically, the air conditioning unit 210 (heating, ventilation, and air conditioning, HVAC) can adjust the temperature in a vehicle compartment and includes an air intake end portion 211, an air duct mechanism 212, a blower 213, a connection channel 214, a temperature control module 215, and an air supply end portion 216. Further, as shown in FIG. 1A to FIG. 4C, the air intake end portion 211 of the air conditioning unit 210 includes an outer air intake end portion 211a and an inner air intake end portion 211c. The outer air intake end portion 211a is used to absorb outside air OAR, the inner air intake end portion 211c is used to absorb interior air IAR. The blower 213 is installed in the air duct mechanism 212 and may be controlled to be activated to create a negative pressure environment on the upstream side of the blower 213 and create a positive pressure environment on the downstream side of the blower 213, thereby generating an air flow flowing from the outer air intake end portion 211a or the inner air intake end portion 211c through the air duct mechanism 212, the connection channel 214, and the temperature control module 215 to the air supply end portion 216, wherein the outside air OAR and the interior air IAR merge to form air conditioning air AR after passing through the blower 213. Moreover, in the embodiment, as shown in FIG. 1B and FIG. 1C, the temperature control module 215 has a refrigerating unit 215a and a heating unit 215c, which may cool or warm the air conditioning air AR flowing into the temperature control module 215 through the blower 213 according to requirements, so as to provide a comfortable ambient temperature in the vehicle compartment.

Generally speaking, as shown in FIG. 1B, the refrigerating unit 215a of the temperature control module 215 may be an evaporator of a refrigeration cycle system, has an inlet for refrigerant inflow and an outlet for refrigerant outflow, and is connected to a compressor 215b to circulate the refrigerant for use. During the process of cooling the air conditioning air AR, the refrigerating unit 215a exchanges heat between the air conditioning air AR from the blower 213 and the refrigerant, and the refrigerant absorbs heat to cool the air conditioning air AR. During the cooling process, that is, in a cooling mode of the vehicle air conditioning system 200, since water vapor in the air conditioning air AR is converted into water droplets at the same time, the refrigerating unit 215a of the temperature control module 215 may also have the function of dehumidification, and as shown in FIG. 1B, a comfortable ambient humidity in the vehicle compartment may be implemented without activating the dehumidification device 100.

On the other hand, during the process of warming the air flow, that is, in a warming mode of the vehicle air conditioning system 200, the air conditioning air AR from the blower 213 may be heated and warmed up through turning off the refrigerating unit 215a and the compressor 215b of the refrigeration cycle system and activating the heating unit 215c. For example, in the embodiment, the heating unit 215c may be a heater having a thermistor with a positive temperature coefficient (PTC) and may directly heat the air, a heater core that dissipates heat through heat exchange between a refrigerant heated by exhaust heat of an engine and passing air, a heater core that dissipates heat through heat exchange between a refrigerant heated by an electric heater and passing air, etc. In addition, when the air conditioning unit 210 is a heat pump type, the heating unit 215c may be an indoor condenser, and the refrigerant compressed and heated by the compressor 215b flows into the indoor condenser. In this case, when the air from the blower 213 passes through the heating unit 215c, the air may exchange heat with the high temperature and high pressure refrigerant of the indoor condenser, and the refrigerant dissipates heat, which may also warm the air.

However, in the warming mode of the vehicle air conditioning system 200, when the external air temperature is low and the cooling unit 215c operates, frost forms on the cooling unit 215c, so the cooling unit 215c cannot be used for dehumidification. Therefore, as shown in FIG. 1C, dehumidification needs to be performed through activating the dehumidification device 100, so as to implement a comfortable ambient humidity in the vehicle compartment.

Furthermore, as shown in FIG. 1A and FIG. 3C, in the embodiment, the dehumidification device 100 has a dehumidification element DHE, which can adjust the humidity in the vehicle compartment. For example, as shown in FIG. 3C, in the embodiment, the dehumidification element DHE is a thin dehumidification element and may contain composite material HASClay® synthesized from amorphous aluminum silicate and low crystallinity clay as an adsorbent to absorb moisture in the air, thereby dehumidifying air passing through the dehumidification element DHE. The composite material HASClay® has the advantages of high safety, high adsorption performance within a low humidity range, high speed adsorption of moisture or regeneration cycle, high regeneration efficiency, low power consumption regeneration, low ventilation resistance, high reliability, high heat resistance, light weight, and low cost. In addition, as the adsorbent, besides the composite material HASClay®, a hygroscopic agent such as zeolite, silica gel, and other polymer adsorbents that have high hygroscopicity under a specified humidity environment may also be used. In addition, the thin dehumidification element may, for example, be a honeycomb-shaped base material or a mesh-shaped base material, as long as a component that can be heated through energization is used as a base material that supports the hygroscopic agent. In addition, the thin dehumidification element may also have another type of structure, wherein a predetermined hygroscopic agent is carried on a pleated and air permeable sheet to form a moisture absorption portion, and a heater (a heating portion) of the thin dehumidification element directly contacts the carried moisture absorption portion and heats the moisture absorption portion. In this case, the heater is a plate-shaped heater extending along the direction of the air flow and directly contacts the moisture absorption portion in almost the entire longitudinal direction. Moreover, through using the structural configuration of the thin dehumidification element, the dehumidification device 100 can implement the smallest system volume under the condition of having the same dehumidification capacity. In other words, although the system volume changes according to the dehumidification capacity, since the thin dehumidification elements may be disposed in series, even if the dehumidification device 100 is provided with multiple thin dehumidification elements in order to increase the dehumidification capacity, the size increase caused by the series connection may still be controlled within a small range.

On the other hand, when the amount of moisture adsorbed increases with the lapse of time, the adsorption capacity gradually drops. Under the above condition, the dehumidification device 100 regenerates the dehumidification element DHE by directly heating the dehumidification element DHE through electricity after moisture absorption through a built-in heater (not shown) disposed therein to remove moisture from the adsorbent. In this way, the dehumidification element DHE may be directly heated through the built-in heater to replace air heating, so the regeneration process of the dehumidification element DHE may be efficiently completed in a short time. Also, in the embodiment, the built-in heater has a thermistor with a positive temperature coefficient (PTC) whose resistance value increases as the temperature rises. In this way, the built-in heater has a self-regulating characteristic that suppresses the temperature rise to a predetermined temperature during the regeneration process. Thereby, it is possible to suppress smoke and fire due to abnormal heating, while providing the necessary regeneration temperature to the dehumidification element DHE. In addition, since the dehumidification device 100 is located on the downstream side of the blower 213 and is in a positive pressure environment, heated humidified air MAR can leave the dehumidification device 100 based on ambient pressure, so that the adsorption capacity of the dehumidification element DHE is restored, thereby regenerating the dehumidification element DHE.

Moreover, as shown in FIG. 1A to FIG. 2, in the embodiment, the dehumidification device 100 is disposed between the blower 213 and the temperature control module 215, and a part of the air conditioning air AR flowing in from the blower 213 flows into the dehumidification device 100. Moreover, as shown in FIG. 1A, after the air conditioning air AR flowing into the dehumidification device 100 is dehumidified by the dehumidification device 100, dried air conditioning air DAR dehumidified by the dehumidification device 100 may return to mix with the air conditioning air AR that is not dehumidified. In this way, the vehicle air conditioning system 200 may control the humidity of the air conditioning air AR flowing out of the air supply end portion 216 through mixing the dried air conditioning air DAR dehumidified by the dehumidification device 100 and the air conditioning air AR that is not dehumidified in a main flow channel MC, so that the dehumidification device 100 can be used as the humidity adjustment unit of the vehicle air conditioning system 200. Moreover, through enabling a part of the air conditioning air AR pumped by the blower 213 of the air conditioning unit 210 to the temperature control module 215 to flow to the dehumidification device 100, the dehumidification device 100 does not need to be equipped with a dedicated air supply component, which can simplify the structure and save cost.

The control process and the specific structure when the dehumidification device 100 is used as the humidity adjustment unit of the vehicle air conditioning system 200 will be further explained below with reference to FIG. 3A to FIG. 4C.

Specifically, as shown in FIG. 1A and FIG. 3A to FIG. 4C, in the embodiment, the dehumidification device 100 is disposed on the connection channel 214 connecting the blower 213 of the air conditioning unit 210 and the temperature control module 215. In this way, the impact on the size of the vehicle air conditioning system 200 when the dehumidification device 100 is installed therein can be minimized through using a dead zone between the blower 213 and the temperature control module 215.

Further, as shown in FIG. 1A and FIG. 4A to FIG. 4C, the air conditioning unit 210 also includes the main flow channel MC and a branch flow channel BC. The main flow channel MC is communicated with the air intake end portion 211 and the air supply end portion 216 of the air conditioning unit 210 and is used for the air conditioning air AR flowing in to flow from the blower 213 to the temperature control module 215. The branch flow channel BC diverges from the main flow channel MC, is communicated with the main flow channel MC and the dehumidification device 100, and is used for a part of the air conditioning air AR flowing in from the blower 213 to flow into the dehumidification device 100. Moreover, as shown in FIG. 4A to FIG. 4C, in the embodiment, the connection channel 214 is formed as a part of the main flow channel MC, and the branch flow channel BC is communicated with the connection channel 214.

Moreover, as shown in FIG. 3A to FIG. 4C, in the embodiment, the dehumidification device 100 further includes an air volume adjusting mechanism VA and an air path switching mechanism SW, wherein the air volume adjusting mechanism VA is used to form one of an air inflow channel IN and an air discharge channel EX. The air path switching mechanism SW is used to form the other one of the air inflow channel IN and the air discharge channel EX, wherein the air inflow channel IN is communicated with the branch flow channel BC and may be used for the air conditioning air AR passing through the branch flow channel BC to flow into the dehumidification device 100. The dehumidification element DHE is disposed on a flow path of the part of the air conditioning air AR flowing in from the blower 213 between the air volume adjusting mechanism VA and the air path switching mechanism SW.

Furthermore, as shown in FIG. 3A to FIG. 4C, in the embodiment, the air volume adjusting mechanism VA is used to form the air inflow channel IN, and the air path switching mechanism SW is used to form the air discharge channel EX. For example, in the embodiment, the air volume adjusting mechanism VA and the air path switching mechanism SW both include a damper structure DP that can adjust the degree of opening, and as shown in FIG. 3C, the dehumidification device 100 also includes an actuator AC. The actuator AC is connected to the damper structure DP of the air volume adjusting mechanism VA and the damper structure DP of the air path switching mechanism SW through a mechanism. In this way, as shown in FIG. 3C to FIG. 4C, the actuator AC may be used to control the degree of opening of the damper structure DP to adjust the air volume of the air conditioning air AR flowing into the dehumidification device 100 and also control the degree of opening of the damper structure DP of the air path switching mechanism SW to switch the air discharge channel EX between a return air path RP and a discharge air path EP, wherein the return air path RP is an air path for returning the dehumidified dried air conditioning air DAR back to the main flow path MC of the air conditioning unit 210, and the discharge air path EP is an air path for discharging the humidified air MAR generated after heating the dehumidification device 100 to the outside of the vehicle.

In this way, the dehumidification device 100 may switch between dehumidification and regeneration processes through the air path selection of the air path switching mechanism SW, and the dried air conditioning air DAR dehumidified by the dehumidification device 100 can be adjusted to be supplied at a predetermined air volume and the humidified air MAR generated after heating the dehumidification device 100 may be discharged at a predetermined air volume through controlling the degree of opening of the damper structure DP of the air volume adjusting mechanism VA.

Further, in the embodiment, there are multiple dehumidification devices 100, including a first dehumidification device 100-1 and a second dehumidification device 100-2, wherein when dehumidification is performed through the dehumidification element DHE of one of the first dehumidification device 100-1 and the second dehumidification device 100-2, the other one of the first dehumidification device 100-1 and the second dehumidification device 100-2 heats the dehumidification element DHE of the other one to regenerate the other one of the first dehumidification device 100-1 and the second dehumidification device 100-2. In this way, the dehumidification device 100 can alternately dehumidify the air conditioning air AR flowing into the dehumidification device 100 through both the first dehumidification device 100-1 and the second dehumidification device 100-2 without interruption, and can also intermittently regenerate the first dehumidification device 100-1 and the second dehumidification device 100-2 respectively, thereby keeping preferable dehumidification performance all the time.

Further, as shown in FIG. 4A, in the embodiment, when the vehicle air conditioning system 200 cools the air, that is, in the cooling mode of the vehicle air conditioning system 200, the dehumidification device 100 does not operate. At this time, in the dehumidification device 100, the air volume adjusting mechanism VA of the first dehumidification device 100-1, the air volume adjusting mechanism VA of the second dehumidification device 100-2, the built-in heater of the first dehumidification device 100-1, and the built-in heater of the second dehumidification device 100-2 are all turned off, and the air discharge channels EX of the air path switching mechanism SW of the first dehumidification device 100-1 and the air path switching mechanism SW of the second dehumidification device 100-2 are both switched to the discharge air paths EP with the return air paths RP closed.

On the other hand, when the vehicle air conditioning system 200 warms the air, that is, in the warming mode of the vehicle air conditioning system 200, the dehumidification device 100 operates and sequentially switches in turn the sizes of the degrees of opening of the damper structures DP of the air volume adjusting mechanism VA of the first dehumidification device 100-1 and the air volume adjusting mechanism VA of the second dehumidification device 100-2, opening states of the built-in heater of the first dehumidification device 100-1 and the built-in heater of the second dehumidification device 100-2, and switching states of the air path switching mechanism SW of the first dehumidification device of 100-1 and the air path switching mechanism SW of the second dehumidification device 100-2 between different paths. Hereinafter, the control parameter change situations of the dehumidification device 100 as various elements of the vehicle air conditioning system 200 in the warming mode during different time periods will be further explained with reference to FIG. 4B, FIG. 4C, and FIG. 6.

For example, in the embodiment, when dehumidification is performed through the first dehumidification device 100-1, that is, during a first time period T1 shown in FIG. 6, as shown in FIG. 4B, the damper structure DP of the air volume adjusting mechanism VA of the first dehumidification device 100-1 is opened, so that the air conditioning air AR passing through the branch flow channel BC flows into the dehumidification device 100 for dehumidification, and the air path switching mechanism SW of the first dehumidification device 100-1 switches the air discharge channel EX of the first dehumidification device 100-1 to the return air path RP of the first dehumidification device 100-1, so that the dried air conditioning air DAR dehumidified by the first dehumidification device 100-1 can return to the main flow channel MC of the air conditioning unit 210. Also, at the same time, the built-in heater of the second dehumidification device 100-2 is also turned on to heat the dehumidification element DHE of the second dehumidification device 100-2, so as to regenerate the second dehumidification device 100-2. At this time, as shown in FIG. 4C, the air path switching mechanism SW of the second dehumidification device 100-2 switches the air discharge channel EX of the second dehumidification device 100-2 to the discharge air path EP of the second dehumidification device 100-2, and the damper structure DP of the air volume adjusting mechanism VA of the second dehumidification device 100-2 is also opened, so that the humidified air MAR generated after heating the second dehumidification device 100-2 can leave the second dehumidification device 100-2 and be discharged to the outside of the vehicle based on the ambient pressure.

Similarly, in the embodiment, when dehumidification is performed through the second dehumidification device 100-2, that is, during a second time period T2 shown in FIG. 6, the damper structure DP of the air volume adjusting mechanism VA of the second dehumidification device 100-2 is also opened as shown in FIG. 4B, so that the air conditioning air AR passing through the branch flow channel BC flows into the dehumidification device 100 for dehumidification, and the air path switching mechanism SW of the second dehumidification device 100-2 switches the air discharge channel EX of the second dehumidification device 100-2 to the return air path RP of the second dehumidification device 100-2, so that the dried air conditioning air DAR dehumidified by the second dehumidification device 100-2 can return to the main flow channel MC of the air conditioning unit 210. Also, at the same time, the built-in heater of the first dehumidification device 100-1 is also turned on to heat the dehumidification element DHE of the first dehumidification device 100-1, so as to regenerate the first dehumidification device 100-1. At this time, the air path switching mechanism SW of the first dehumidification device 100-1 switches the air discharge channel EX of the first dehumidification device 100-1 to the discharge air path EP of the first dehumidification device 100-1 as shown in FIG. 4C, and the damper structure DP of the air volume adjusting mechanism VA of the first dehumidification device 100-1 is also opened, so that the humidified air MAR generated after heating the second dehumidification device 100-2 can leave the second dehumidification device 100-2 and be discharged to the outside of the vehicle based on the ambient pressure.

On the other hand, in the embodiment, the degree of opening of the damper structure DP of the air volume adjusting mechanism VA can be used to form and adjust the size of an adjustable cross-sectional area of an inflow pathway of the branch flow channel BC, so that the sizes of the degrees of opening of the damper structure DP of the air volume adjusting mechanism VA of the first dehumidification device 100-1 and the damper structure DP of the air volume adjusting mechanism VA of the second dehumidification device 100-2 determine an air inflow volume of the air conditioning air AR passing through the first dehumidification device 100-1 and the second dehumidification device 100-2 and an air supply volume. Moreover, the required air volumes of the first dehumidification device 100-1 and the second dehumidification device 100-2 during the dehumidification process and the regeneration process vary due to operating conditions. During the dehumidification process, in order to meet the requirements of humidity control, there is a certain requirement for the air supply volume of the dehumidified dried air conditioning air DAR. When the air supply volume of the dehumidified dried air conditioning air DAR fluctuates with time, the dehumidification performance also fluctuates with time, thereby affecting the anti-fog performance in the vehicle. On the other hand, during the regeneration process, if the air volume of the humidified air MAR on the regeneration side increases, the ambient temperature will decrease, and the dehumidification performance may also drop. However, once the air supply volume of the humidified air MAR on the regeneration side decreases, the dew point temperature of the humidified air MAR may increase. In the case where the dew point temperature of the humidified air MAR exceeds a threshold value of the dew point temperature of air at a discharge port, condensation may easily occur during discharge from the vehicle, thereby risking deteriorating the vehicle body. Therefore, in the embodiment, the degree of opening of the damper structure DP of the air volume adjusting mechanism VA is kept, so that the air supply volume of the dehumidified dried air conditioning air DAR and the air supply volume of the humidified air MAR generated after heating are both controlled in a certain manner. For example, in the embodiment, the air supply volume of the dehumidified dried air conditioning air DAR is 45 $m^3/h$, and the air supply volume of the humidified air MAR generated after heating is 5 $m^3/h$.

In other words, in the embodiment, the air supply volume of the dehumidified dried air conditioning air DAR during the dehumidification process is greater than the air supply volume of the humidified air MAR generated after heating during the regeneration process. Therefore, as shown in FIG. 4B and FIG. 4C, in the embodiment, when dehumidification is performed through the second dehumidification device 100-2, the degree of opening of the damper structure DP of the air volume adjusting mechanism VA of the second dehumidification device 100-2 is greater than the degree of opening of the damper structure DP of the air volume adjusting mechanism VA of the first dehumidification device 100-1, and when dehumidification is performed through the first dehumidification device 100-1, the degree of opening of the damper structure DP of the air volume adjusting mechanism VA of the first dehumidification device 100-1 is greater than the degree of opening of the damper structure DP of the air volume adjusting mechanism VA of the second dehumidification device 100-2.

In this way, through sequentially and synchronously switching in turn the sizes of the degrees of opening of the damper structures DP of the air volume adjusting mechanism VA of the first dehumidification device 100-1 and the air volume adjusting mechanism VA of the second dehumidification device 100-2, the opening states of the built-in heater of the first dehumidification device 100-1 and the built-in heater of the second dehumidification device 100-2, and the switching states of the air path switching mechanism SW of the first dehumidification device of 100-1 and the air path switching mechanism SW of the second dehumidification device 100-2 between different paths continuously during the first time period T1 and the second time period T2, the dehumidification device 100 can alternately dehumidify the air conditioning air AR flowing into the dehumidification device 100 through the first dehumidification device 100-1 and the second dehumidification device 100-2, and regenerate the first dehumidification device 100-1 or the second dehumidification device 100-2 at the same time.

In addition, the damper structure DP of the air volume adjusting mechanism VA of the first dehumidification device 100-1 and the damper structure DP of the air volume adjusting mechanism VA of the second dehumidification device 100-2 may be respectively used to adjust the air volume of the air conditioning air AR flowing into the first dehumidification device 100-1 and the air volume of the air conditioning air AR flowing into the second dehumidification device 100-2. Therefore, through adjusting the degrees of opening of the damper structure DP of the air volume adjusting mechanism VA of the first dehumidification device 100-1 and the damper structure DP of the air volume adjusting mechanism VA of the second dehumidification device 100-2, the dried air conditioning air DAR dehumidified by the dehumidification device 100 can be adjusted to be supplied at a predetermined air volume and the humidified air MAR generated after heating the dehumidification device 100 can be discharged at a predetermined air volume respectively when the dehumidification device 100 performs the dehumidification and regeneration processes on the air conditioning air AR flowing into the dehumidification device 100 through any one of the first dehumidification device 100-1 and the second dehumidification device 100-2.

Furthermore, in the embodiment, the size relationship of the air volume of the air conditioning air AR flowing into the dehumidification device 100 via the branch flow channel BC relative to the air volume of the air conditioning air AR of the main flow channel MC may also be controlled through adjusting the sizes of the degrees of opening of the damper structure DP of the air volume adjusting mechanism VA of the first dehumidification device 100-1 and the damper structure DP of the air volume adjusting mechanism VA of the second dehumidification device 100-2. For example, as shown in FIG. 5A and FIG. 5B, in the embodiment, the adjustable cross-sectional area of the inflow pathway of the branch flow channel BC is less than or equal to half of the cross-sectional area of the connection channel 214 (that is, the main flow channel MC). Thus, in the embodiment, the air volume of the part of the air conditioning air AR flowing into the dehumidification device 100 from the branch flow channel BC is less than or equal to the air volume of another part of the air conditioning air AR not flowing into the dehumidification device 100 in the main flow channel MC. In this way, through controlling the air volume of the air conditioning air AR flowing into the dehumidification device 100 via the branch flow channel BC to be less than the air volume of the air conditioning air AR of the main flow channel MC, increases in ventilation resistance in the air conditioning unit 210 can be suppressed and increases in power consumption of the blower 213 can be suppressed.

In addition, as shown in FIG. 6, the air volume of the blower 213 of the vehicle air conditioning system 200 changes according to the temperature inside the vehicle, and different ambient pressures are correspondingly generated to control the air supply volume of the vehicle air conditioning system 200. Therefore, when the first dehumidification device 100-1 and the second dehumidification device 100-2 of the dehumidification device 100 perform the dehumidification or regeneration process, the air supply volume of the dehumidified dried air conditioning air DAR or the regenerated humidified air MAR is also affected by the different ambient pressures formed by the blower 213. At this time, the sizes of the degrees of opening of the damper structure DP of the air volume adjusting mechanism VA of the first dehumidification device 100-1 and the damper structure DP of the air volume adjusting mechanism VA of the second dehumidification device 100-2 of the dehumidification device 100 may also be adjusted corresponding to the sizes of the air supply volumes passing through the blower 213 of the vehicle air conditioning system 200 in different temperature ranges.

Furthermore, when the air conditioning air AR flowing into the dehumidification device 100 is dehumidified through the first dehumidification device 100-1 or the second dehumidification device 100-2, as the temperature inside the vehicle increases, the air volume of the air conditioning air AR of the main flow channel MC becomes smaller, and the ambient positive pressure also becomes smaller. At this time, the degree of opening of the damper structure DP of the air volume adjusting mechanism VA of the first dehumidification device 100-1 or the damper structure DP of the air volume adjusting mechanism VA of the second dehumidification device 100-2 also becomes larger. On the other hand, when the dehumidification element of the first dehumidification device 100-1 or the dehumidification element of the second dehumidification device 100-2 is regenerated, as the temperature inside the vehicle increases, the air volume of the air conditioning air AR of the main flow channel MC becomes smaller, and the ambient positive pressure also becomes smaller. At this time, the size of the degree of opening of the damper structure DP of the air volume adjusting mechanism VA of the first dehumidification device 100-1 or the damper structure DP of the air volume adjusting mechanism VA of the second dehumidification device 100-2 also becomes larger.

In other words, the sizes of the degrees of opening of the damper structure DP of the air volume adjusting mechanism VA of the first dehumidification device 100-1 and the damper structure DP of the air volume adjusting mechanism VA of the second dehumidification device 100-2 correspondingly increase as the air supply volume of the blower 213 decreases. In this way, when the ambient positive pressure of the blower 213 drops, a certain passing air volume value can still be kept. In this way, during the operating process of the dehumidification device 100, the dehumidified dried air conditioning air DAR and the heated humidified air MAR discharged from the vehicle can both be kept constant, thereby keeping preferable dehumidification performance all the time. Moreover, in addition to keeping the preferable dehumidification performance of the dehumidification device 100, the dew point temperature of the humidified air MAR may also be maintained to prevent condensation during discharge from the vehicle that risks deteriorating the vehicle body.

Moreover, as shown in FIG. 6, even if the sizes of the degrees of opening of the damper structure DP of the air volume adjusting mechanism VA of the first dehumidification device 100-1 and the damper structure DP of the air volume adjusting mechanism VA of the second dehumidification device 100-2 increases with the temperature inside the vehicle, there is a tendency to become larger during both dehumidification and regeneration, but the size of the degree of opening during dehumidification is still kept greater than the size of the degree of opening during regeneration and keeps a certain proportion. In this way, the air volume of the air conditioning air AR for dehumidification and the air volume for discharging the heated humidified air MAR to the outside of the vehicle in the air conditioning air AR introduced from the blower 213 to the dehumidification device 100 can be maintained at a constant proportion.

In addition, as shown in FIG. 6, since the dehumidification device 100 sequentially and continuously operates the built-in heater of the first dehumidification device 100-1 and the built-in heater of the second dehumidification device 100-2 in turn, the total power of the built-in heater 130 used for the regeneration process by the dehumidification device 100 may also be maintained at a certain value, thereby enabling the load of the system power shared by the dehumidification device 100 and the vehicle air conditioning system 200 to be kept relatively stable.

In this way, through simply controlling the configuration of the size of the degree of opening of the damper structure DP of the air volume adjusting mechanism VA of the dehumidification device 100, the size relationship of the air volume of the air conditioning air AR flowing into the dehumidification device 100 via the branch flow channel BC relative to the air volume of the air conditioning air AR of the main flow channel MC can be controlled, and the air supply volume during the dehumidification and regeneration processes of the air conditioning air AR flowing into the dehumidification device 100 can be adjusted. Moreover, during the dehumidification and regeneration processes of the air conditioning air, the dehumidified dried air conditioning air DAR and the heated humidified air discharged from the vehicle can both be kept constant, and the dehumidification performance of the dehumidification device 100 can be kept stable.

Furthermore, the dehumidification device 100 can alternately dehumidify the air conditioning air AR flowing into the dehumidification device 100 through both the first dehumidification device 100-1 and the second dehumidification device 100-2 without interruption, and can also intermittently regenerate the first dehumidification device 100-1 and the second dehumidification device 100-2 respectively, thereby keeping preferable dehumidification performance all the time.

In addition, it is worth noting that in the foregoing embodiments, although the size relationship of the air volume of the air conditioning air AR flowing into the dehumidification device 100 via the branch flow channel BC relative to the air volume of the air conditioning air AR of the main flow channel MC may be controlled through simply adjusting the sizes of the degrees of opening of the damper structure DP of the air volume adjusting mechanism VA of the first dehumidification device 100-1 and the damper structure DP of the air volume adjusting mechanism VA of the second dehumidification device 100-2, the disclosure is not limited thereto. In other embodiments, other mechanisms may also be disposed to more finely control the air volumes of the air conditioning air AR in the branch flow channel BC and the main flow channel MC. Further description will be made below with reference to FIG. 7A to FIG. 8.

Figure 7B:
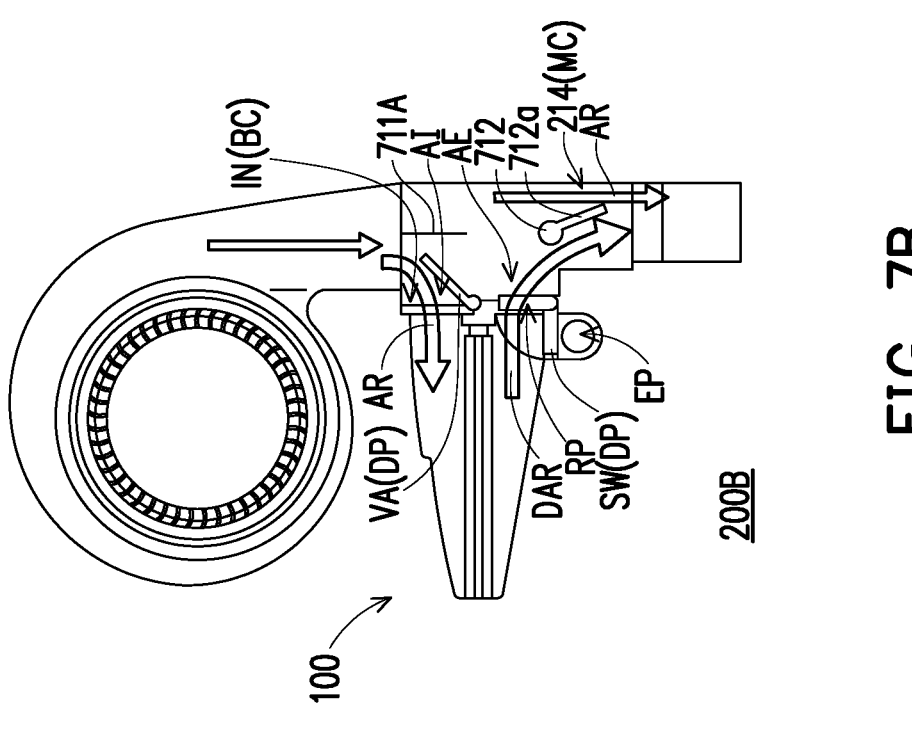
FIG. 7A to FIG. 7C are schematic cross-sectional views of different vehicle air conditioning systems of FIG. 1A.
Figure 7A:
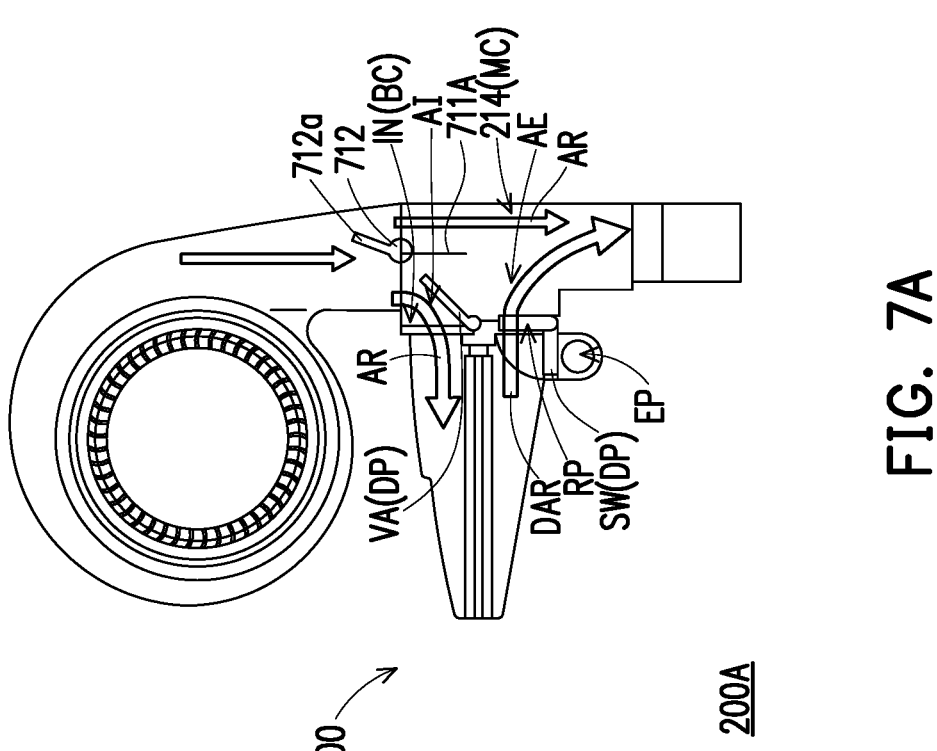
Figure 7C:
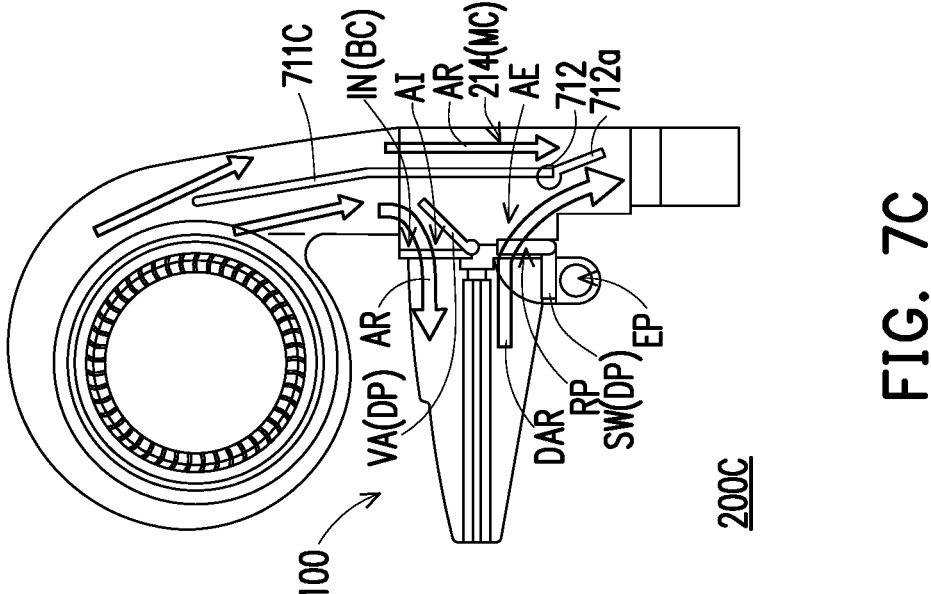
Figure 8:
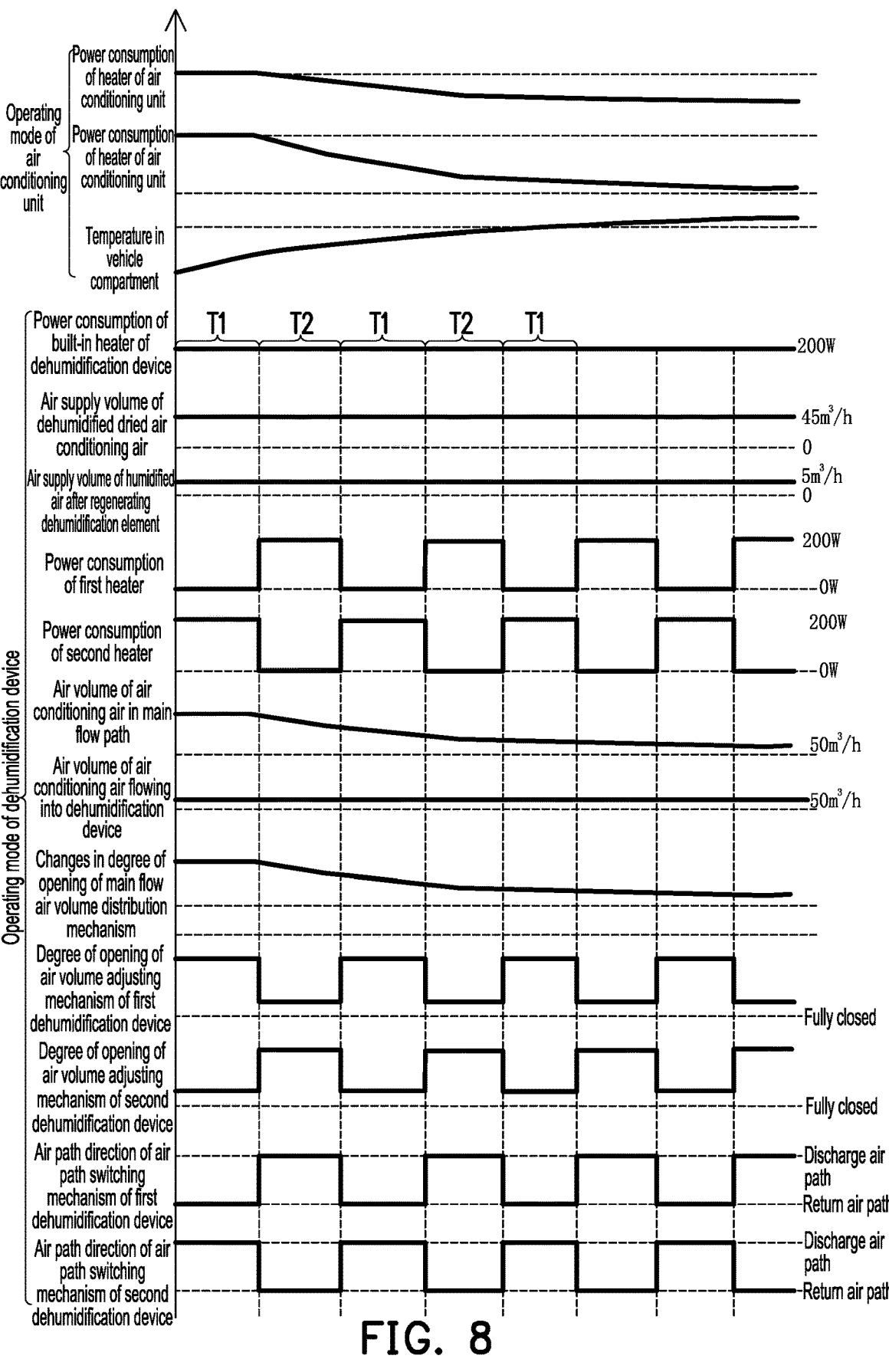
FIG. 8 is a schematic view of control parameter change situations of various elements of the vehicle air conditioning system of FIG. 7A to FIG. 7C during different time periods.

FIG. 7A to FIG. 7C are schematic cross-sectional views of different vehicle air conditioning systems of FIG. 1A. FIG. 8 is a schematic view of control parameter change situations of various elements of the vehicle air conditioning system of FIG. 7A to FIG. 7C during different time periods. Please refer to FIG. 7A and FIG. 7B. Vehicle air conditioning systems 200A, 200B, and 200C of the embodiments are similar to the vehicle air conditioning system 200, and the differences are as follows.

In the embodiments of FIG. 7A to FIG. 7C, the vehicle air conditioning system 200A, 200B, or 200C further includes a main flow air volume distribution mechanism 712 In the embodiments, the main flow air volume distribution mechanism 712 is disposed in the main flow channel MC, wherein the main flow air volume distribution mechanism 712 includes a damper structure 712a that may freely adjust a damper direction to be used to control the air volume of the air conditioning air AR in the main flow channel MC.

For example, in the embodiment of FIG. 7A, the main flow air volume distribution mechanism 712 of the vehicle air conditioning system 200A is located on a connection portion 214a of an air supply port of the blower 213 for connecting the main flow channel MC and the connection channel 214 and extends toward the upstream side of the air supply port of the blower 213. Also, as shown in FIG. 7A, through controlling the damper direction of the damper structure 712a of the main flow air volume distribution mechanism 712, the projection area of the damper structure 712a of the main flow air volume distribution mechanism 712 on the cross-section of the connection channel 214 may be adjusted at the same time. In this way, the channel area of a flow inlet of the main flow channel MC in the connection channel 214 may be adjusted, thereby controlling the air volume of the air conditioning air AR flowing from the blower 213 into the main flow channel MC in the connection channel 214.

For example, in the embodiments of FIG. 7B and FIG. 7C, the main flow air volume distribution mechanism 712 of the vehicle air conditioning system 200B or 200C is located on the flow path of the dehumidified dried air conditioning air DAR flowing from an exhaust port AE of the dehumidification device 100 to the temperature control module 215, and the dehumidified dried air conditioning air DAR merges with another part of the air conditioning air AR that has not flowed into the dehumidification device 100 in the main flow path MC after passing through the main flow air volume distribution mechanism 712. Moreover, as shown in FIG. 7B and FIG. 7C, through controlling the damper direction of the damper structure 712a of the main flow air volume distribution mechanism 712, the projection area of the damper structure 712a of the main flow air volume distribution mechanism 712 on the cross-section of the connection channel 214 may also be adjusted at the same time. In this way, the channel area of the discharge port of the main flow channel MC in the connection channel 214 may be adjusted, thereby also controlling the air volume of the air conditioning air AR of the main flow channel MC in the connection channel 214.

In this way, in the embodiments of FIG. 7A, FIG. 7B, and FIG. 7C, the degree of opening of the damper structure 712a of the main flow air volume distribution mechanism 712 is adjusted corresponding to the sizes of the air supply volumes passing through the blower 213 of the vehicle air conditioning system 200A, 200B, or 200C in different temperature ranges, so as to control the air volume of the air conditioning air AR in the main flow channel MC. Specifically, as shown in FIG. 7A, FIG. 7B, and FIG. 7C, in the case where the air supply volume passing through the blower 213 of the vehicle air conditioning system 200A, 200B, or 200C changes according to a change in temperature inside the vehicle, the projection area of the damper structure 712a of the main flow air volume distribution mechanism 712 on the cross-section of the connection channel 214 may be adjusted through controlling the degree of opening of the damper structure 712a of the main flow air volume distribution mechanism 712, so as to adjust the air volume of the air conditioning air AR of the main flow channel MC in the connection channel 214. In this way, even in the case where the air supply volume passing through the blower 213 of the vehicle air conditioning system 200A, 200B, or 200C gradually drops according to an increase in temperature inside the vehicle to control the air supply volume of high temperature air of the vehicle air conditioning system 200, the channel area of the main flow channel MC in the connection channel 214 may be reduced through correspondingly decreasing the degree of opening of the damper structure 712a of the main flow air volume distribution mechanism 712 as the air supply volume of the blower 213 decreases, so that the air volume of the air conditioning air AR of the main flow channel MC is correspondingly decreased. In this way, the air conditioning air AR flowing into the dehumidification device 100 via the branch flow channel BC can still be kept at a certain air volume.

In this way, as shown in FIG. 8, although the air volume of the blower 213 of the vehicle air conditioning system 200A, 200B, or 200C changes according to the temperature inside the vehicle, different ambient pressures are correspondingly generated to control the air supply volume of the vehicle air conditioning system 200A, 200B, or 200C. However, since the air conditioning air AR flowing into the dehumidification device 100 via the branch flow channel BC can still be kept at a certain air volume, the ambient pressure in the branch flow channel BC can still be kept constant. Therefore, the sizes of the degrees of opening of the damper structure DP of the air volume adjusting mechanism VA of the first dehumidification device 100-1 and the damper structure DP of the air volume adjusting mechanism VA of the second dehumidification device 100-2 may not change with the size of the air supply volume of the blower 213, but still be kept at a certain passing air volume value.

In this way, during the operating process of the dehumidification device 100, the dried air conditioning air DAR dehumidified through the dehumidification device 100 of the vehicle air conditioning system 200A, 200B, or 200C and the heated humidified air MAR discharged from the vehicle can still be kept constant, thereby keeping preferable dehumidification performance all the time. Therefore, effects and advantages similar to those of the vehicle air conditioning system 200 can also be achieved, so details are not repeated here.

On the other hand, in the embodiments of FIG. 7A and FIG. 7B, the vehicle air conditioning system 200A or 200B further includes a partition 711A. Specifically, in the embodiment, the partition 711A is disposed in the main flow channel MC and is used to divert a part of the air conditioning air AR in the main flow channel MC to the branch flow channel BC. Further, as shown in FIG. 7A and FIG. 7B, the partition 711A faces an air inlet AI of the dehumidification device 100, and the partition 711A extends from an end of the air inlet AI of the dehumidification device 100 to the other end of the air inlet AI of the dehumidification device 100. In this way, through the configuration of the partition 711A, a substantial boundary of the branch flow channel BC may be drawn in the main flow channel MC, and the part of the air conditioning air AR diverted to the branch flow channel BC can more efficiently flow into the air inlet AI of the dehumidification device 100.

In addition, in the embodiment of FIG. 7C, the vehicle air conditioning system 200C may further extend the partition 711A of FIG. 7A, so that the air conditioning air AR flowing into the dehumidification device 100 via the branch flow channel BC can still be kept at a certain air volume. For example, as shown in FIG. 7C, a partition 711C of the vehicle air conditioning system 200C faces the air inlet AI and the exhaust port AE of the dehumidification device 100, and the partition 711C extends from the upstream side of the air supply port of the blower 213 for connecting the main flow channel MC to an end of the exhaust port AE of the dehumidification device 100 away from the air inlet AI. In this way, a certain proportion of the air volume of the air conditioning air AR from the blower 213 is introduced into the branch flow channel BC through extending the partition 711C. Therefore, even in the case where the air supply volume passing through the blower 213 of the vehicle air conditioning system 200C gradually drops according an increase in temperature inside the vehicle, the air conditioning air AR from the blower 213 can be introduced into the dehumidification device 100 at a fixed proportion all the time.

In this way, the vehicle air conditioning systems 200A, 200B, and 200C can more finely control the air volumes of the air conditioning air AR in the branch flow channel BC and the main flow channel MC through the configuration of mechanical components such as the main flow air volume distribution mechanism 712 and/or the partitions 711A and 711C, so that the air conditioning air AR flowing into the dehumidification device 100 via the branch flow channel BC can be kept at a certain air volume all the time. Moreover, in the foregoing embodiments, since the vehicle air conditioning system 200A, 200B, or 200C also adopts the dehumidification device 100, effects and advantages similar to those of the vehicle air conditioning system 200 can also be achieved, so details are also not repeated here.

In summary, in the vehicle air conditioning system of the embodiments of the disclosure, the dehumidification device can keep both the dehumidified dried air conditioning air and the heated humidified air discharged from the vehicle constant during the dehumidification and regeneration processes of the air conditioning air through controlling the degree of opening of the damper structure of the air volume adjusting mechanism, so that the dehumidification performance of the dehumidification device can be kept stable. Moreover, the dehumidification device can also adjust the air volume of another part of the air conditioning air in the main flow channel through controlling the degree of opening of the damper structure of the main flow air volume distribution mechanism, so that the air conditioning air flowing into the dehumidification device via the branch flow channel can be kept at a certain air volume. In this way, during the dehumidification and regeneration processes of the air conditioning air, the dehumidified dried air conditioning air and the heated humidified air discharged from the vehicle can be kept constant, so that the dehumidification performance of the dehumidification device can be kept stable. In addition, since the dehumidification device can alternately dehumidify the air in the vehicle through both the dehumidification element of the first dehumidification device and the dehumidification element of the second dehumidification device without interruption, and intermittently regenerate the dehumidification element of the first dehumidification device and the dehumidification device of the second dehumidification device respectively, the preferable dehumidification function of the dehumidification device can be kept all the time.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle air conditioning system, comprising:
an air conditioning unit, configured to adjust temperature in a vehicle compartment and comprising a blower and a temperature control module; and
a dehumidification device, configured to adjust humidity in the vehicle compartment, disposed between the blower and an evaporator of the temperature control module, and enabling a part of air conditioning air flowing in from the blower to flow into the dehumidification device, and the dehumidification device comprising:
an air volume adjusting mechanism, used to form an air inflow channel of the dehumidification device;
an air path switching mechanism, used to form an air discharge channel of the dehumidification device; and
a dehumidification element, disposed on a flow path of the part of the air conditioning air flowing in from the blower between the air volume adjusting mechanism and the air path switching mechanism,
wherein the air volume adjusting mechanism and the air path switching mechanism both comprise a damper structure configured to adjust a degree of opening, and during an operating process of the dehumidification device, the dehumidification device controls the degrees of opening of the damper structures of the air volume adjusting mechanism and the air path switching mechanism, so that the part of the air conditioning air passing through the dehumidification device is kept constant.

2. The vehicle air conditioning system according to claim 1, wherein the degree of opening of the damper structure of the air volume adjusting mechanism is adjusted corresponding to a size of an air supply volume passing through the blower of the vehicle air conditioning system in different temperature ranges.

3. The vehicle air conditioning system according to claim 2, wherein the dehumidification device further comprises:
an actuator; and
a connection mechanism, wherein the actuator connects the air volume adjusting mechanism and the air path switching mechanism through the connection mechanism to control the degrees of opening of the damper structures of both the air volume adjusting mechanism and the air path switching mechanism.

4. The vehicle air conditioning system according to claim 1, wherein the air conditioning unit further comprises a main flow channel and a branch flow channel, the main flow channel is communicated with an air intake end portion and an air supply end portion of the air conditioning unit and is used for the air conditioning air flowing in to flow from the blower to the temperature control module, and the branch flow channel diverges from the main flow channel, is communicated with the main flow channel and the air inflow channel of the dehumidification device, and is used for the part of the air conditioning air flowing in from the blower to flow into the dehumidification device.

5. The vehicle air conditioning system according to claim 4, wherein the air path switching mechanism switches the air discharge channel between a return air path and a discharge air path, wherein the return air path is an air path for returning dehumidified dried air conditioning air back to the main flow path of the air conditioning unit, and the discharge air path is an air path for discharging humidified air generated after heating the dehumidification device to an outside of a vehicle.

6. The vehicle air conditioning system according to claim 4, wherein the dehumidification device is disposed on a connection channel connecting the blower of the air conditioning unit and the temperature control module.

7. The vehicle air conditioning system according to claim 6, wherein the connection channel is formed as a part of the main flow path, the branch flow channel is communicated with the connection channel, the degree of opening of the damper structure of the air volume adjusting mechanism is used to form and adjust a size of an adjustable cross-sectional area of an inflow pathway of the branch flow channel, and the adjustable cross-sectional area of the inflow pathway of the branch flow channel is less than or equal to half of a cross-sectional area of the connection channel.

8. The vehicle air conditioning system according to claim 6, wherein an air volume of the part of the air conditioning air flowing from the branch flow path into the dehumidification device is less than or equal to an air volume of another part of air conditioning air that does not flow into the dehumidification device in the main flow path.

9. The vehicle air conditioning system according to claim 4, further comprising:
a partition, disposed in the main flow channel and used to divert the part of the air conditioning air in the main flow channel to the branch flow channel.

10. The vehicle air conditioning system according to claim 9, wherein the partition faces an air inlet of the dehumidification device, and the partition extends from an end of the air inlet of the dehumidification device to other end of the air inlet of the dehumidification device.

11. The vehicle air conditioning system according to claim 9, wherein the partition faces an air inlet and an exhaust port of the dehumidification device, and the partition extends from an upstream side of an air supply port of the blower for connecting the main flow channel to an end of the exhaust port of the dehumidification device away from the air inlet.

12. The vehicle air conditioning system according to claim 4, further comprising:
a main flow air volume distribution mechanism, disposed in the main flow channel and comprising a damper structure configured to adjust a degree of opening, wherein the degree of opening of the damper structure of the main flow air volume distribution mechanism is adjusted corresponding to a size of an air supply volume passing through the blower of the vehicle air conditioning system in different temperature ranges to control an air volume of air conditioning air in the main flow channel.

13. The vehicle air conditioning system according to claim 12, wherein the main flow air volume distribution mechanism is located on a flow path of dehumidified dried air conditioning air flowing from an exhaust port of the dehumidification device to the temperature control module, and the dehumidified dried air conditioning air merges with another part of air conditioning air that does not flow into the dehumidification device in the main flow channel after passing through the main flow air volume distribution mechanism.

14. The vehicle air conditioning system according to claim 12, wherein the degree of opening of the damper structure of the main air flow distribution mechanism adjusts a size of a channel area of another part of air conditioning air that does not flow into the dehumidification device in the main flow channel.

15. The vehicle air conditioning system according to claim 2, wherein there are a plurality of dehumidification devices, comprising a first dehumidification device and a second dehumidification device, wherein when dehumidification is performed through the dehumidification element of one of the first dehumidification device and the second dehumidification device, other one of the first dehumidification device and the second dehumidification device heats the dehumidification element of the other one to regenerate the other one of the first dehumidification device and the second dehumidification device.

16. The vehicle air conditioning system according to claim 15, wherein:

when dehumidification is performed through the first dehumidification device, a degree of opening of a damper structure of an air volume adjusting mechanism of the first dehumidification device is greater than a degree of opening of a damper structure of an air volume adjusting mechanism of the second dehumidification device, when dehumidification is performed through the second dehumidification device, the degree of opening of the damper structure of the air volume adjusting mechanism of the second dehumidification device is greater than the degree of opening of the damper structure of the air volume adjusting mechanism of the first dehumidification device.

17. The vehicle air conditioning system according to claim 16, wherein:

the degrees of opening of the damper structures of the air volume adjusting mechanisms of both the first dehumidification device and the second dehumidification device are adjusted corresponding to the size of the air supply volume passing through the blower of the vehicle air conditioning system in different temperature ranges.

18. The vehicle air conditioning system according to claim 17, wherein:

the degrees of opening of the damper structures of the air volume adjusting mechanisms of both the first dehumidification device and the second dehumidification device correspondingly increase as the air supply volume of the blower decreases.

19. The vehicle air conditioning system according to claim 16, further comprising:

a main flow air volume distribution mechanism, comprising a damper structure configured to adjust a degree of opening, wherein the degree of opening of the damper structure of the main flow air volume distribution mechanism is adjusted corresponding to the size of the air supply volume passing through the blower of the vehicle air conditioning system in different temperature ranges to control an air volume of air conditioning air in the main flow channel, the degree of opening of the damper structure of the main flow air volume distribution mechanism correspondingly decreases as the air supply volume of the blower decreases.

20. The vehicle air conditioning system according to claim 19, wherein:

the degrees of opening of the damper structures of the air volume adjusting mechanisms of both the first dehumidification device and the second dehumidification device do not change with the size of the air supply volume of the blower.

* * * * *